United States Patent
Jordan et al.

(10) Patent No.: US 11,611,297 B2
(45) Date of Patent: Mar. 21, 2023

(54) ANTI-PINCH MOTOR CONTROL

(71) Applicant: Gentherm Inc., Northville, MI (US)

(72) Inventors: Patrick Jordan, Austin, TX (US);
Dusko Petrovski, Rochester, MI (US);
Nigel John Allison, Austin, TX (US)

(73) Assignee: Gentherm Inc., Northville, MI (US)

( * ) Notice: Subject to any disclaimer, the term of this patent is extended or adjusted under 35 U.S.C. 154(b) by 250 days.

(21) Appl. No.: 17/024,964

(22) Filed: Sep. 18, 2020

(65) Prior Publication Data

US 2022/0094282 A1    Mar. 24, 2022

(51) Int. Cl.
*H02P 3/06* (2006.01)
*E05F 15/40* (2015.01)
*E05F 15/695* (2015.01)
*B60J 1/17* (2006.01)

(52) U.S. Cl.
CPC ............... *H02P 3/06* (2013.01); *E05F 15/40* (2015.01); *E05F 15/695* (2015.01); *B60J 1/17* (2013.01); *E05Y 2400/40* (2013.01); *E05Y 2400/52* (2013.01); *E05Y 2800/41* (2013.01); *E05Y 2900/55* (2013.01)

(58) Field of Classification Search
CPC . H02P 3/06; E05F 15/40; E05F 15/695; B60J 1/17; E05Y 2400/40; E05Y 2400/52
USPC .......................... 318/445, 626, 560
See application file for complete search history.

(56) References Cited

U.S. PATENT DOCUMENTS

| | | | |
|---|---|---|---|
| 4,347,465 A | 8/1982 | Goertler et al. | |
| 4,585,981 A | 4/1986 | Zintler | |
| 4,641,067 A | 2/1987 | Iizawa et al. | |
| 4,686,598 A | 8/1987 | Herr | |
| 5,069,000 A | 12/1991 | Zuckerman | |
| 5,436,539 A | 7/1995 | Wrenbeck et al. | |
| 5,627,710 A | 5/1997 | Schoeffler | |
| 5,663,620 A | 9/1997 | Mizuno et al. | |
| 5,963,001 A | 10/1999 | Peter et al. | |
| 5,977,732 A | 11/1999 | Matsumoto | |
| 5,982,126 A | 11/1999 | Hellinga et al. | |

(Continued)

FOREIGN PATENT DOCUMENTS

CN    109025607 A    12/2018
DE    3303590 A1     8/1984

(Continued)

OTHER PUBLICATIONS

International Search Report and Written Opinion dated Dec. 10, 2021 corresponding to International Application No. PCT/US2021/050155, 13 pages.

*Primary Examiner* — David Luo

(57) ABSTRACT

A motor control system configured to detect a pinch condition of a structure actuated by a motor includes a pinch detection module configured to receive a current signal indicative of a motor current, determine a rate of change of current based on the current signal, and generate a pinch signal indicative of the pinch condition in response to either one of the motor current being greater than a current threshold and the rate of change of current being greater than a rate of change threshold. The motor control system further includes a position control module configured to control the motor to actuate the structure in response to an input and at least one of stop and reverse the motor in response to the pinch signal.

19 Claims, 4 Drawing Sheets

(56) References Cited

U.S. PATENT DOCUMENTS

| | | | |
|---|---|---|---|
| 6,051,945 A | 4/2000 | Furukawa | |
| 6,150,782 A | 11/2000 | Breitling et al. | |
| 6,239,610 B1 | 5/2001 | Knecht et al. | |
| 6,377,009 B1 | 4/2002 | Philipp | |
| 6,456,027 B1 | 9/2002 | Pruessel | |
| 6,504,332 B1 | 1/2003 | Lamm | |
| 6,597,139 B1 | 7/2003 | Klesing | |
| 6,677,720 B2* | 1/2004 | Fraser | B60N 2/0244 318/432 |
| 6,686,669 B1 | 2/2004 | Knab et al. | |
| 6,794,837 B1 | 9/2004 | Whinnery et al. | |
| 6,806,664 B2 | 10/2004 | Beishline | |
| 6,864,654 B1 | 3/2005 | Letor et al. | |
| 6,936,988 B2 | 8/2005 | Nakazawa et al. | |
| 6,940,246 B2 | 9/2005 | Mochizuki et al. | |
| 6,952,087 B2 | 10/2005 | Lamm | |
| 6,967,451 B2* | 11/2005 | Miyauchi | E05F 15/41 318/443 |
| 7,023,161 B2 | 4/2006 | Iwasaki et al. | |
| 7,196,486 B2 | 3/2007 | Nakamura et al. | |
| 7,250,736 B2 | 7/2007 | Hirai | |
| 7,305,290 B2 | 12/2007 | Russ et al. | |
| 7,479,748 B2 | 1/2009 | Averitt et al. | |
| 7,518,325 B2* | 4/2009 | Odland | H02P 3/08 318/469 |
| 7,690,152 B2 | 4/2010 | Kobayashi et al. | |
| 7,714,526 B2 | 5/2010 | Kawakura et al. | |
| 7,786,689 B2 | 8/2010 | Rosch | |
| 7,977,902 B2 | 7/2011 | Batejat et al. | |
| 8,198,849 B2 | 6/2012 | Lamm | |
| 8,390,231 B2 | 3/2013 | Bizard | |
| 8,463,505 B2 | 6/2013 | Egger et al. | |
| 8,633,666 B2 | 1/2014 | Guarnizo | |
| 8,725,440 B2 | 5/2014 | Knezevic et al. | |
| 8,991,103 B2 | 3/2015 | Schlesiger et al. | |
| 9,030,144 B2 | 5/2015 | Boisvert et al. | |
| 9,294,031 B2* | 3/2016 | Bessho | E05F 15/41 |
| 9,543,755 B2 | 1/2017 | Pasinato | |
| 10,348,083 B2 | 7/2019 | Dumais | |
| 2003/0137265 A1 | 7/2003 | de Frutos | |
| 2012/0191305 A1 | 7/2012 | Ersek et al. | |

FOREIGN PATENT DOCUMENTS

| | | |
|---|---|---|
| DE | 3332813 A1 | 3/1985 |
| DE | 4127047 A1 | 2/1993 |
| DE | 4445106 A1 | 6/1996 |
| DE | 19809628 B4 | 6/2007 |
| EP | 0799514 B1 | 8/1998 |
| EP | 0992098 B1 | 10/2002 |
| GB | 2323184 B | 11/1999 |
| WO | WO-1997025762 A1 | 7/1997 |
| WO | WO-2015068111 A1 | 5/2015 |

\* cited by examiner

ANTI-PINCH MOTOR CONTROL

FIELD

The present disclosure relates to motor control systems, and more particularly to pinch detection and prevention for motor control systems.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Brushed DC motors have been used to adjust a position of seats, mirrors, windows, or other components in automotive, aeronautical, or other applications. For example, seat motors are used to move a seat assembly forward, backward, up and down, to adjust an angular position or tilt of a backrest portion relative to a seat portion of the seat assembly, etc. Conversely, window motors are used to raise and lower windows.

In some applications, Hall Effect sensors are used to sense the positions of the motors. Each motor needs to have one or more corresponding Hall Effect sensors and wiring. Accordingly, Hall Effect sensors and wiring may represent a relatively expensive component of motor assemblies.

SUMMARY

A motor control system configured to detect a pinch condition of a structure actuated by a motor includes a pinch detection module configured to receive a current signal indicative of a motor current, determine a rate of change of current based on the current signal, and generate a pinch signal indicative of the pinch condition in response to either one of the motor current being greater than a current threshold and the rate of change of current being greater than a rate of change threshold. The motor control system further includes a position control module configured to control the motor to actuate the structure in response to an input and at least one of stop and reverse the motor in response to the pinch signal.

In other features, the structure is a window of a vehicle. The position control module is configured to generate the pinch signal further in response to a determination that the window is within a pinch range. The position control module is configured to disable movement of the window toward a closed position for a predetermined period subsequent to the pinch signal indicating detection of the pinch condition. The pinch detection module includes a first comparator configured to compare the motor current to the current threshold and a second comparator configured to compare the rate of change of current to the rate of change threshold. The pinch detection module includes a delay element configured to sample the motor current and a subtractor configured to output the rate of change of current based on a difference between the motor current and the motor current as previously sampled by the delay element.

In other features, the pinch detection module includes a sample/hold circuit configured to capture a value of the motor current at a position of the structure corresponding to a pinch range. The pinch detection module includes a summer configured to output the current threshold based on a sum of the value of the motor current captured by the sample/hold circuit and a current offset. The current offset is selected such that a sum of the value of the motor current captured by the sample/hold circuit and the current offset corresponds to a predetermined value greater than an expected current during unobstructed operation of the motor in a pinch range of the structure. The motor control system further includes a current detection module configured to monitor a current ripple of the motor and calculate the motor current based on the current ripple.

A method of detecting a pinch condition of a structure actuated by a motor includes receiving a current signal indicative of a motor current, determining a rate of change of current based on the current signal, generating a pinch signal indicative of the pinch condition in response to either one of the motor current is greater than a current threshold and the rate of change of current is greater than a rate of change threshold, controlling the motor to actuate the structure in response to an input, and at least one of stopping and reversing the motor in response to the pinch signal.

In other features, the structure is a window of a vehicle. The method further includes generating the pinch signal in response to a determination that the window is within a pinch range. The method further includes disabling movement of the window toward a closed position for a predetermined period subsequent to the pinch signal indicating detection of the pinch condition. The method further includes using a first comparator to compare the motor current to the current threshold and using a second comparator to compare the rate of change of current to the rate of change threshold. The method further includes sampling the motor current and outputting the rate of change of current based on a difference between the motor current and the motor current as previously sampled.

In other features, the method further includes capturing a value of the motor current at a position of the structure corresponding to a pinch range. The method further includes outputting the current threshold based on a sum of the captured value of the motor current and a current offset. The method further includes selecting the current offset such that a sum of the captured value of the motor current and the current offset corresponds to a predetermined value greater than an expected current during unobstructed operation of the motor in a pinch range of the structure. The method further includes monitoring a current ripple of the motor and calculating the motor current based on the current ripple.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Some motor control systems implement anti-pinch mechanisms configured to reverse and/or stop the motor if an obstruction is detected (e.g., during closure of a window, movement of a seat, etc.). In some examples, anti-pinch mechanisms use measured characteristics of the motor (e.g., current to the motor, speed of the motor, etc.) to determine pinch conditions.

For example, accurate motor control requires detection of a speed and/or position (e.g., an absolute position) of a motor during operation. In some examples, Hall Effect sensors can be used to detect the absolute position of the motor. In other examples, sensors such as shunt and/or amplifier sensors are used to detect motor current and/or speed. Accordingly, anti-pinch mechanisms may use values received from sensors to detect pinch conditions.

In sensorless systems (i.e., systems that do not use Hall Effect or other sensors), the position of the motor may be tracked by sensing and counting ripples in the motor current, which correspond to commutation of the motor. Anti-pinch motor control systems and methods according to the present disclosure are configured to determine motor current and detect pinch conditions based on the motor current. For example, the motor control system monitors ripple current and calculates conditions such as motor speed, current, and rate of change of current based on the ripple current. Onset of pinch conditions caused by an obstruction may be detected based on changes in the determined conditions. Although described below with respect to window control, the principles of the present disclosure may be applied to anti-pinch motor control systems for vehicle seats (e.g., movement of front seats and/or rear folding seats), lift gate closure, running board movement, etc.

Figure 1:
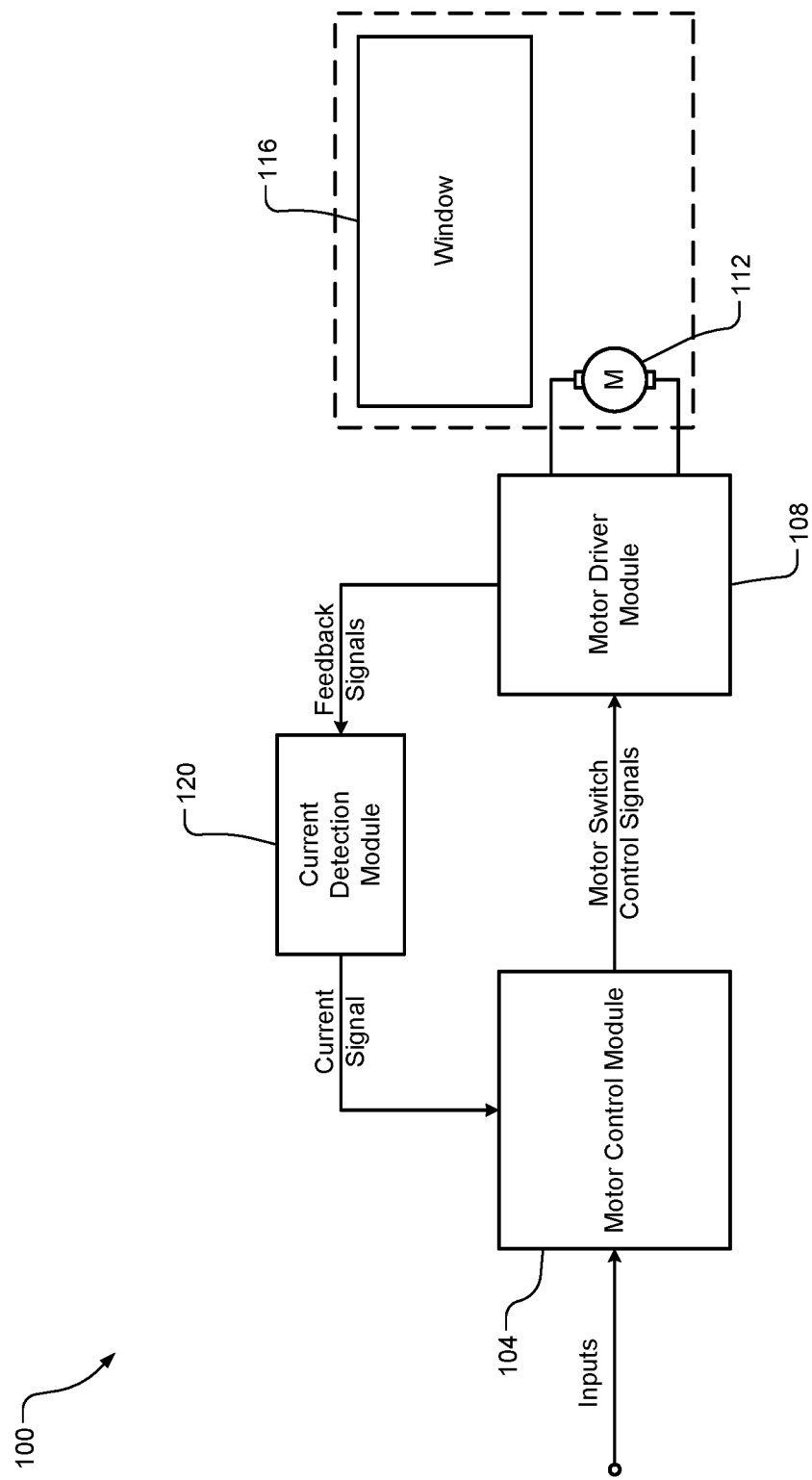
FIG. 1 is a functional block diagram of an example anti-pinch motor control system according to the present disclosure.

Referring now to FIG. 1, a functional block diagram of an anti-pinch motor control system 100 according to the present disclosure includes a motor control module 104 and a motor driver module 108 configured to control one or more motors 112. For example, the motor 112 is arranged to raise and lower a window 116 (shown schematically) of a vehicle. In some examples, the motor 112 is a brushed DC motor.

The motor control system 100 receives one or more switch inputs that are actuated by an occupant of the vehicle to adjust the window 116. The motor control module 104 generates motor switch control signals based on the switch inputs and provides the motor switch control signals to the motor driver module 108. For example, the motor control module 104 provides control signals, such as pulse width modulation (PWM) motor control signals, to the motor driver module 108 based on the switch inputs. The motor control module 104 receives feedback signals from the motor driver module 108. For example, the feedback signals include signals indicative of DC voltage and current. In some examples, the feedback signals include signals from one or more sensors, such as Hall Effect sensors. The motor driver module 108 is configured to control the motor 112 based on the motor switch control signals. For example, the motor driver module 108 includes one or more switches (e.g., in an H-bridge arrangement) configured to provide power to the motor 112 as described below in more detail.

The motor control module 104 is configured to determine motor current based on the feedback signals and detect pinch conditions based on the motor current. In one example, a current detection module 120 monitors ripple current based (e.g., as indicated in the feedback signals) and calculates motor current based on the ripple current. The motor control module 104 receives a current signal from the current detection module 120, calculates changes in the current and a rate of change of the current based on the received current signal, and detects onset of pinch conditions based on a magnitude of the current and the rate of change of the current. For example, the motor control module 104 may generate a pinch signal indicating a pinch condition is detected in response to the magnitude of the current exceeding a current threshold and in response to the rate of change of the current exceeding a rate change threshold as described below in more detail.

In examples including one or more sensors or components configured to directly measure motor conditions (e.g., a Hall Effect sensor configured to measure a magnetic field indicative of motor rotation, a shunt resistor configured to provide a signal indicative of current, etc.), the current detection module 120 may receive other measurements indicative of current and generate the current signal using these measurements.

Figure 2:
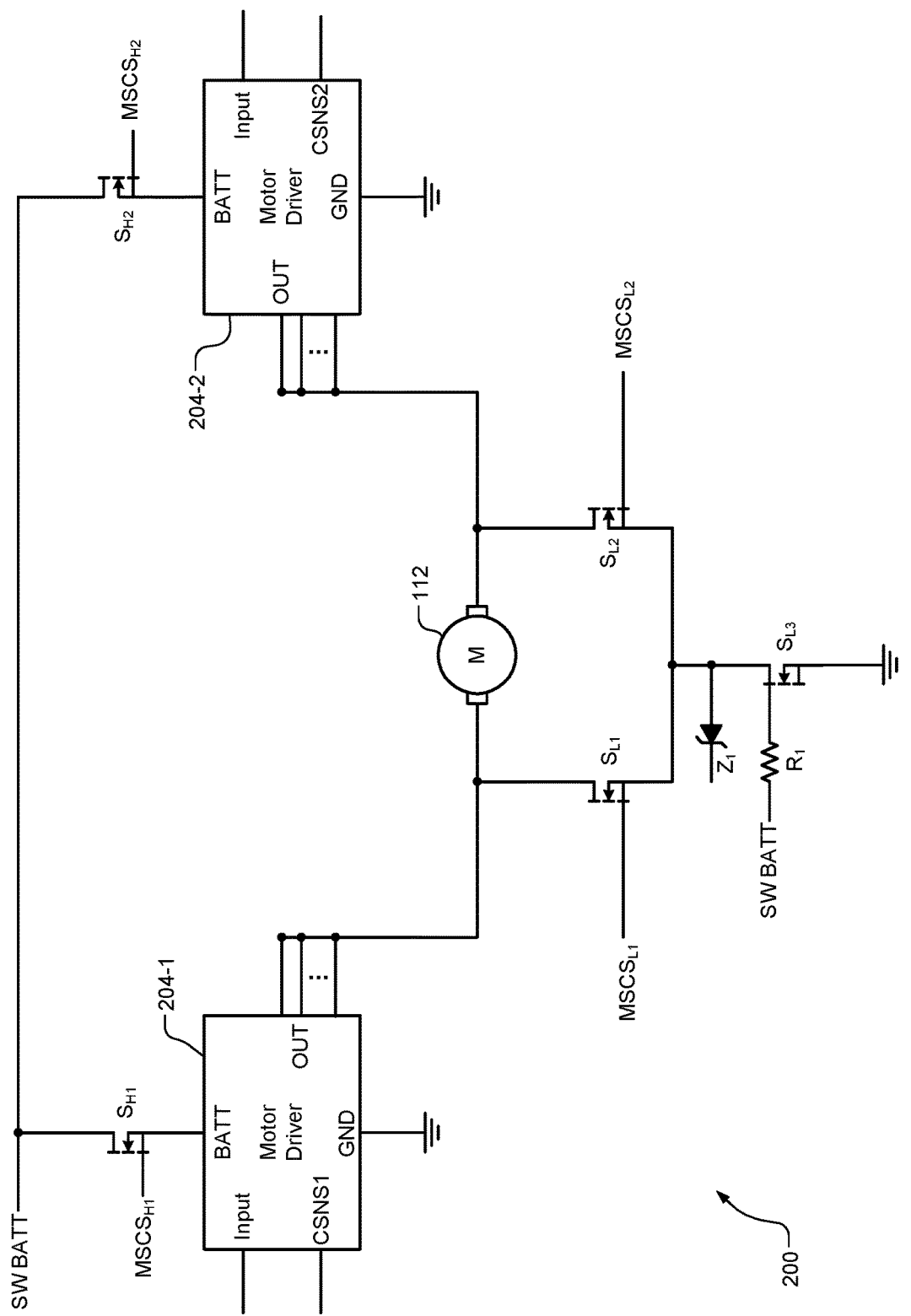
FIG. 2 is a functional block diagram and electrical schematic of an example motor driver module according to the present disclosure.

Referring now to FIG. 2, an example schematic of a motor driver module 200 (e.g., corresponding to the motor driver module 108 of FIG. 1) is shown in more detail to include one or more motor driver modules 204-1 and 204-2, high side (HS) switches $S_{H1}$ and $S_{H2}$, and low side (LS) switches $S_{L1}$, $S_{L2}$ and $S_{L3}$. A battery voltage is selectively connected via the high side switches $S_{H1}$ or $S_{H2}$ to motor driver modules 204-1 and 204-2, respectively, in response to the motor switch control signals output by the motor control module 104. For example, the motor switch control signals include signals $MSCS_{H1}$, $MSCS_{H2}$, and $MSCS_{L1}$, $MSCS_{L2}$ provided to selectively actuate the switches $S_{H1}$, $S_{H2}$, $S_{L1}$, and $S_{L2}$, respectively. In this manner, the motor driver modules 204-1 and 204-2 control current output to the motor 112. For example, the motor switch control signals enable the motor driver module 204-1 for a first rotational direction of the motor (such as forward) to raise the window 116 and the motor switch control signals enable the motor driver module 204-2 for a second or opposite rotational direction of the motor (such as reverse) to lower the window 116.

Figure 3:
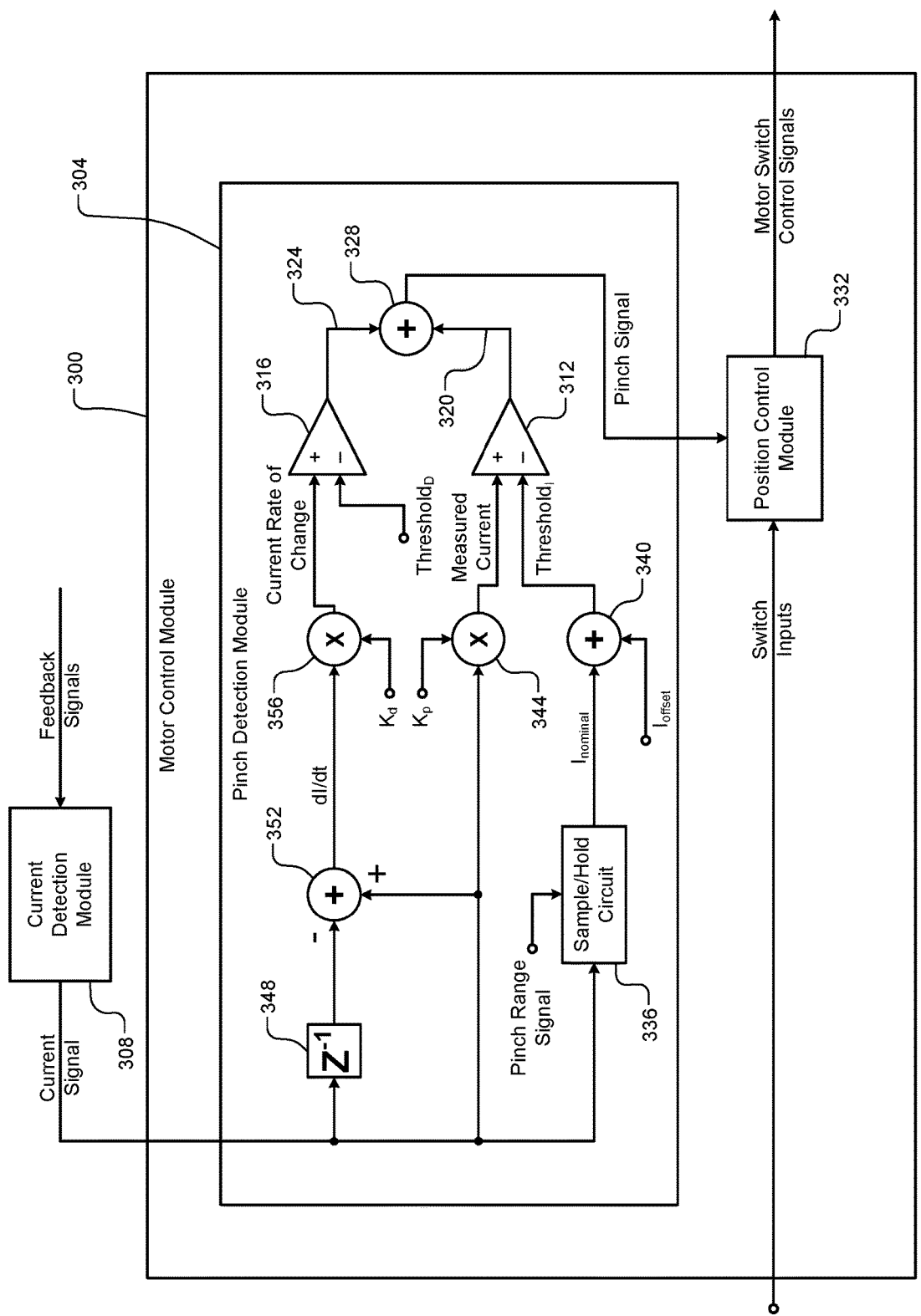
FIG. 3 is a functional block diagram of an example motor control module according to the present disclosure.

Referring now to FIG. 3, an example motor control module 300 according to the present disclosure includes a pinch detection module 304. The pinch detection module 304 receives a current signal (e.g., from a current detection module 308, corresponding to the current detection module 120). For example, the current detection module 308 is configured to monitor a ripple current (i.e., ripple frequency) of the motor 112 and calculate a motor current (e.g., a filtered motor current) based on the ripple current. The pinch detection module 304 detects an onset of a pinch condition based on a magnitude of the current and/or the rate of change of the current, and selectively generates a pinch signal based on the detected onset of the pinch condition. For example, the pinch detection module 304 is configured to generate the pinch signal if the current signal indicates either of (i) the motor current exceeds a current threshold (Threshold$_I$) and/or (ii) a rate of change of the motor current exceeds a rate of change threshold (Threshold$_D$).

As shown in this example, the pinch detection module 304 includes a first comparator (e.g., a first operational amplifier) 312 and a second comparator (e.g., a second operational amplifier) 316. Although described as hardware operational amplifiers, the first and second comparators 312 and 316 may be implemented using software executed by the motor control module 300. The first comparator 312 receives and compares a measured current (e.g., corresponding to the current signal received from the current detection module 308 and indicative of the motor current) to the current threshold Threshold$_I$. Accordingly, an output 320 of the first comparator 312 indicates whether the measured current exceeds a current threshold selected to indicate that a pinch condition is detected. For example, the current threshold is a dynamically calculated or predetermined value greater than an expected or nominal motor current during unobstructed operation of the motor 112. In other words, if the measured current exceeds the current threshold dynamically calculated as an offset from the nominal motor current, a pinch condition is detected.

Similarly, the second comparator 316 receives and compares a calculated current rate of change dI/dt (e.g., calculated based on changes in the current signal received from the current detection module 308) to the rate of change threshold Threshold$_D$. Accordingly, an output 324 of the second comparator 316 indicates whether the current rate of change exceeds a rate of change threshold selected to indicate that a pinch condition is detected. For example, the rate of change threshold is a calculated or predetermined value greater than an expected current rate of change during unobstructed operation of the motor 112. In other words, if the current rate of change exceeds the rate of change threshold, a pinch condition is detected.

The respective outputs 320 and 324 of the first comparator 312 and the second comparator 316 are provided to a summer 328 (e.g., a hardware or software node configured to operate as a logical OR circuit). The summer 328 is configured to output the pinch signal indicative of whether either one of the first comparator 312 or the second comparator 316 detected a pinch condition. In other words, if either of the outputs 320 and 324 indicates that a pinch condition was detected, the pinch signal transitions to a value indicating that a pinch condition was detected (e.g., from 0 to a non-zero value).

The pinch signal is provided to a position control module 332. The position control module 332 is configured to generate the motor switch control signals to control the motor 112 (and, correspondingly, the position of the window 116) based on switch inputs. For example, the position control module 332 may be configured to implement PWM control to control the motor driver module 108/200 to drive the motor 112. The position control module 332 is further configured to generate the motor switch control signals based on the pinch signal. For example, if the pinch control signal indicates that a pinch condition was detected, the position control module 332 is configured to disregard the switch inputs and reverse movement of the window 116. In other words, the pinch signal may override the switch inputs.

In the example pinch detection module 304 shown in FIG. 3, the current signal received from the current detection module 308 may be provided to a sample/hold circuit 336. The sample/hold circuit 336 is configured to sample and hold a value of the current when the window 116 enters a pinch range (e.g., as indicated by a pinch range signal). The pinch range signal is a value indicating a position of the window 116 at a predetermined distance from a fully closed position. In other words, the pinch range signal indicates a position of the window 116 where a pinch condition is likely to occur. Motor current may experience transient conditions (e.g., spikes) associated with start-up currents if the motor 112 is started before the window 116 is the pinch range. The sample/hold circuit 336 outputs a nominal motor current value I$_{nominal}$ that indicates the current when the window 116 is in the pinch range.

The pinch detection module 304 determines the current threshold Threshold$_I$ based on the nominal motor current value I$_{nominal}$ when the window 116 enters the pinch range and a current offset I$_{offset}$. For example, a summer 340 adds the current offset to the nominal motor current value to generate the current threshold. The current offset is selected in accordance with a maximum amount of current that is expected to be required to raise the window 116 in the pinch range in normal (i.e., unobstructed) conditions and an amount of current offset from this maximum amount that associated with a pinch condition. In other words, the maximum amount of current corresponds to a maximum expected force during normal conditions and the current offset corresponds to an amount of force expected in a pinch condition.

Accordingly, the current threshold output by the summer 340 is a value greater than an expected or nominal motor current during unobstructed operation of the motor 112 in the pinch range. For example only, the current threshold may be 1, 2, 3, etc. amps greater than the nominal motor current value in accordance with the current offset. The first comparator 312 compares the measured current to the current threshold as described above. In some examples, the measured current is provided to the first comparator 312 via a multiplier 344 configured to adjust the measured current in accordance with a predetermined gain K$_p$.

In the example pinch detection module 304 shown in FIG. 3, the current signal received from the current detection module 308 may be provided to a delay module 348 and a subtractor 352. For example, the subtractor 352 is configured to output a difference between the measured current value (as indicated by the current signal) and a previous sample of the motor current value captured and output by the delay module 348. For example, the subtractor 352 subtracts the previous sample of the motor current value from the measured current value. Accordingly, the output of the subtractor 352 is the calculated current rate of change dI/dt indicating a direction (i.e., rise or fall) and amount of change in the measured current value.

The second comparator 316 compares the calculated current rate of change to the rate of change threshold (Threshold$_D$) as described above. For example, the rate of change threshold is a value greater than an expected rate of change in motor current during unobstructed operation of the motor 112 in the pinch range. In some examples, the calculated current rate of change is provided to the second comparator 316 via a multiplier 356 configured to adjust the calculated current rate of change in accordance with a predetermined gain K$_d$.

In this manner, as described above, the pinch detection module 304 according to the principles of the present disclosure is configured to detect a pinch condition in response to the motor current (as indicated by the current signal) increasing either too much or too quickly when the window 116 is in the pinch range.

Figure 4:
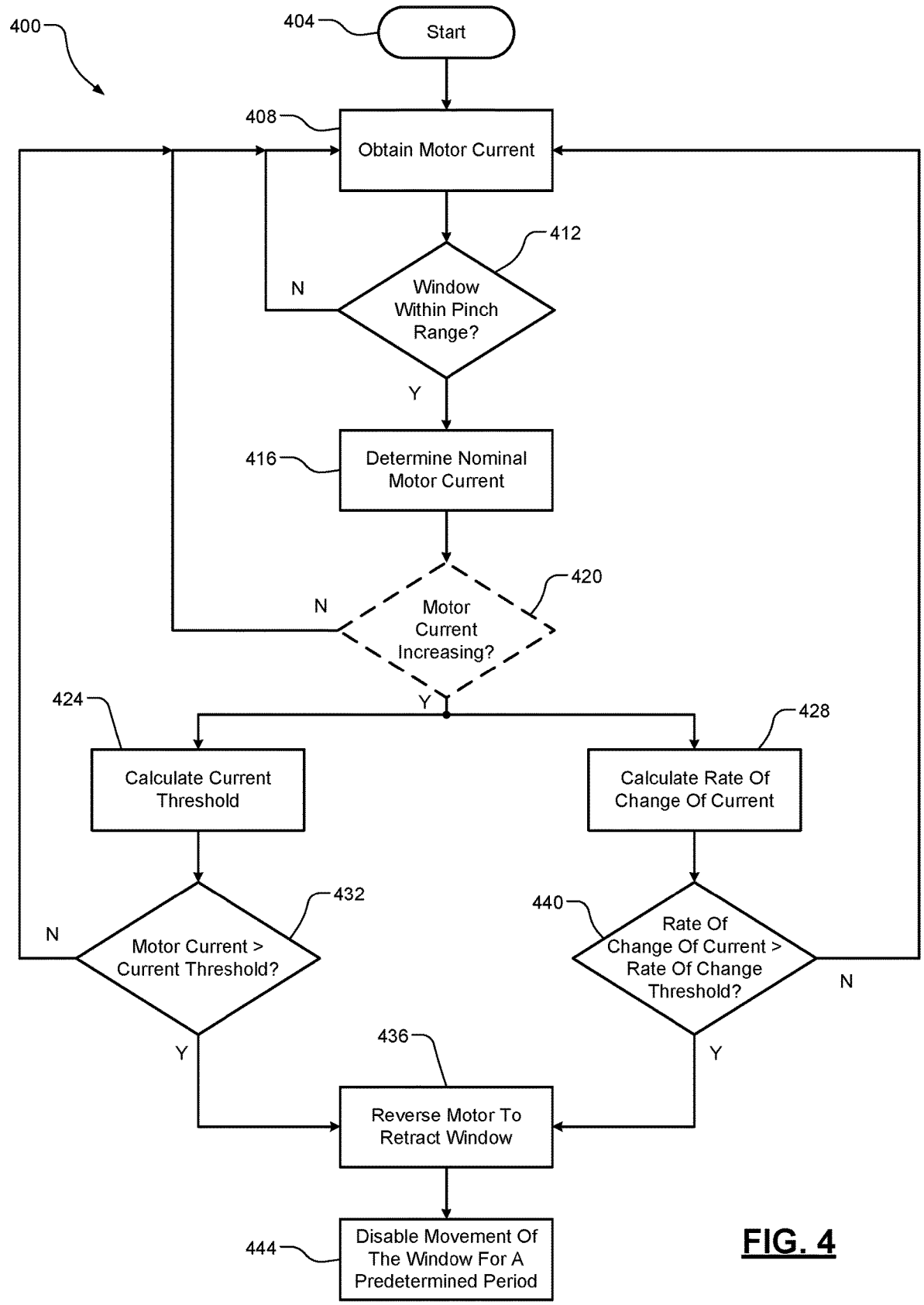
FIG. 4 is an example method for implementing an anti-pinch motor control system according to the present disclosure.

Referring now to FIG. 4, an example method 400 for implementing an anti-pinch motor control system according to the present disclosure begins at 404. At 408, the method 400 (e.g., the motor control module 300) obtains motor current. For example, the motor control module 300 monitors current ripple and calculates motor current based on the current ripple. At 412, the method 400 (e.g., the pinch detection module 304) determines whether a window or other actuated structure is within a pinch range. If true, the method 400 continues to 416. If false, the method 400 continues to 408.

At 416, the method 400 (e.g., the pinch detection module 304) determines a nominal motor current corresponding to an expected motor current during normal operation when the window is in the pinch range. In some examples, the method 400 (e.g., the pinch detection module 304) optionally determines whether the motor current is increasing at 420. For example, the method 400 determines whether a change in current (e.g., dI/dt) is greater than 0. If true, the method 400 continues to 424 and 428. If false, the method 400 continues to 408. In other examples, the method 400 proceeds to directly from 416 to 424.

At 424, the method 400 (e.g., the pinch detection module 304) calculates a current threshold. For example, the current threshold is calculated based on a nominal current value (i.e., the motor current when the window entered the pinch range) and a current offset. At 432, the method 400 (e.g., the pinch detection module 304) determines whether the motor current is greater than the current threshold. If true, the method 400 continues to 436. If false, the method 400 continues to 408.

At 428, the method 400 (e.g., the pinch detection module 304) calculates the rate of change of current (e.g., a derivative of the current dI/dt). For example, the method 400 calculates the rate of change of current based on a difference between motor current and a previously sampled motor current. At 440, the method 400 (e.g., the pinch detection module 304) determines whether the rate of change of current is greater than a rate of change threshold. If true, the method 400 continues to 436. If false, the method 400 continues to 408.

At 436, the method 400 (e.g., the position control module 332) reverses the motor to retract the window in response to either one of the determination that the motor current is greater than the current threshold and the determination that the rate of change of current is greater than the rate of change threshold. For example, the window may be retracted a predetermined or variable (e.g., as calculated in accordance with various operational and/or input parameters) distance from the position where the pinch was detected. At 444, the method 400 (e.g., the position control module 332) may disable movement of the window toward the closed position (i.e., movement in the direction corresponding to the detected pinch) for a predetermined period prior to continuing to 408.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A motor control system configured to detect a pinch condition of a structure actuated by a motor, the motor control system comprising:
a pinch detection module configured to receive a current signal indicative of a motor current, determine whether the structure is within a pinch range, capture a value of the motor current at a position of the structure corresponding to the pinch range, determine a rate of change of current based on the current signal, and generate a pinch signal indicative of the pinch condition in response to either one of (i) the motor current being greater than a current threshold and (ii) the rate of change of current being greater than a rate of change threshold; and
a position control module configured to (i) control the motor to actuate the structure in response to an input and (ii) at least one of stop and reverse the motor in response to the pinch signal.

2. The motor control system of claim 1, wherein the structure is a window of a vehicle.

3. The motor control system of claim 2, wherein the position control module is configured to generate the pinch signal further in response to a determination that the window is within a pinch range.

4. The motor control system of claim 3, wherein the position control module is configured to disable movement of the window toward a closed position for a predetermined period subsequent to the pinch signal indicating detection of the pinch condition.

5. The motor control system of claim 1, wherein the pinch detection module includes a sample/hold circuit configured to capture the value of the motor current at the position of the structure corresponding to the pinch range.

6. The motor control system of claim 5, wherein the pinch detection module includes a summer configured to output the current threshold based on a sum of the value of the motor current captured by the sample/hold circuit and a current offset.

7. The motor control system of claim 6, wherein the current offset is selected such that a sum of the value of the motor current captured by the sample/hold circuit and the current offset corresponds to a predetermined value greater than an expected current during unobstructed operation of the motor in a pinch range of the structure.

8. A motor control system configured to detect a pinch condition of a structure actuated by a motor, the motor control system comprising:
a pinch detection module configured to receive a current signal indicative of a motor current, determine a rate of change of current based on the current signal, and generate a pinch signal indicative of the pinch condition in response to either one of (i) the motor current being greater than a current threshold and (ii) the rate of change of current being greater than a rate of change threshold; and
a position control module configured to (i) control the motor to actuate the structure in response to an input and (ii) at least one of stop and reverse the motor in response to the pinch signal,
wherein the pinch detection module includes a first comparator configured to compare the motor current to the current threshold and a second comparator configured to compare the rate of change of current to the rate of change threshold.

9. A motor control system configured to detect a pinch condition of a structure actuated by a motor, the motor control system comprising:
a pinch detection module configured to receive a current signal indicative of a motor current, determine a rate of change of current based on the current signal, and generate a pinch signal indicative of the pinch condition in response to either one of (i) the motor current being greater than a current threshold and (ii) the rate of change of current being greater than a rate of change threshold; and
a position control module configured to (i) control the motor to actuate the structure in response to an input and (ii) at least one of stop and reverse the motor in response to the pinch signal,
wherein the pinch detection module includes a delay element configured to sample the motor current and a subtractor configured to output the rate of change of current based on a difference between the motor current and the motor current as previously sampled by the delay element.

10. A motor control system configured to detect a pinch condition of a structure actuated by a motor, the motor control system comprising:
a pinch detection module configured to receive a current signal indicative of a motor current, determine a rate of change of current based on the current signal, and generate a pinch signal indicative of the pinch condition in response to either one of (i) the motor current being greater than a current threshold and (ii) the rate of change of current being greater than a rate of change threshold;
a position control module configured to (i) control the motor to actuate the structure in response to an input and (ii) at least one of stop and reverse the motor in response to the pinch signal; and
a current detection module configured to monitor a current ripple of the motor and calculate the motor current based on the current ripple.

11. A method of detecting a pinch condition of a structure actuated by a motor, the method comprising:
receiving a current signal indicative of a motor current;
determining a rate of change of current based on the current signal;
determining whether the structure is within a pinch range,
capturing a value of the motor current at a position of the structure corresponding to a pinch range;
based on the value of the motor current at the position of the structure corresponding to the pinch range, generating a pinch signal indicative of the pinch condition in response to either one of (i) the motor current being greater than a current threshold and (ii) the rate of change of current being greater than a rate of change threshold;
controlling the motor to actuate the structure in response to an input; and
at least one of stopping and reversing the motor in response to the pinch signal.

12. The method of claim 11, wherein the structure is a window of a vehicle.

13. The method of claim 12, further comprising generating the pinch signal in response to a determination that the window is within a pinch range.

14. The method of claim 13, further comprising disabling movement of the window toward a closed position for a predetermined period subsequent to the pinch signal indicating detection of the pinch condition.

15. The method of claim 11, further comprising outputting the current threshold based on a sum of the captured value of the motor current and a current offset.

16. The method of claim 15, further comprising selecting the current offset such that a sum of the captured value of the motor current and the current offset corresponds to a predetermined value greater than an expected current during unobstructed operation of the motor in a pinch range of the structure.

17. A method of detecting a pinch condition of a structure actuated by a motor, the method comprising:
receiving a current signal indicative of a motor current;
determining a rate of change of current based on the current signal;
generating a pinch signal indicative of the pinch condition in response to either one of (i) the motor current is greater than a current threshold and (ii) the rate of change of current greater than a rate of change threshold;
controlling the motor to actuate the structure in response to an input;
at least one of stopping and reversing the motor in response to the pinch signal; and
using a first comparator to compare the motor current to the current threshold and using a second comparator to compare the rate of change of current to the rate of change threshold.

18. A method of detecting a pinch condition of a structure actuated by a motor, the method comprising:
receiving a current signal indicative of a motor current;
determining a rate of change of current based on the current signal;
generating a pinch signal indicative of the pinch condition in response to either one of (i) the motor current is greater than a current threshold and (ii) the rate of change of current greater than a rate of change threshold;
controlling the motor to actuate the structure in response to an input;
at least one of stopping and reversing the motor in response to the pinch signal; and
sampling the motor current and outputting the rate of change of current based on a difference between the motor current and the motor current as previously sampled.

19. A method of detecting a pinch condition of a structure actuated by a motor, the method comprising:
receiving a current signal indicative of a motor current;
determining a rate of change of current based on the current signal;
generating a pinch signal indicative of the pinch condition in response to either one of (i) the motor current is greater than a current threshold and (ii) the rate of change of current greater than a rate of change threshold;
controlling the motor to actuate the structure in response to an input;
at least one of stopping and reversing the motor in response to the pinch signal; and
monitoring a current ripple of the motor and calculating the motor current based on the current ripple.

* * * * *